United States Patent [19]

Tsukune et al.

[11] Patent Number: 4,618,989

[45] Date of Patent: Oct. 21, 1986

[54] METHOD AND SYSTEM FOR DETECTING ELLIPTICAL OBJECTS

[75] Inventors: Hideo Tsukune, Kashiwa; Keisuke Goto, Tokyo, both of Japan

[73] Assignees: Michio Kawata, Director-General of Agency of Industrial Science and Technology; Kabushiki Kaisha Meidensha, both of Japan

[21] Appl. No.: 572,535

[22] Filed: Jan. 19, 1984

[30] Foreign Application Priority Data

Jan. 21, 1983 [JP] Japan .................................... 58-8156

[51] Int. Cl.$^4$ .............................................. G06K 9/46
[52] U.S. Cl. ...................................... 382/25; 382/18; 382/41; 382/22
[58] Field of Search ...................... 382/18, 22, 25, 41; 364/725, 721

[56] References Cited

U.S. PATENT DOCUMENTS 3,936,800  2/1976  Ejiri et al. ............................ 382/18

OTHER PUBLICATIONS

"Detection of Elipses by a Modified Hough Transform", by Tsuji and Matsumoto, *IEEE Transactions on Computers*, C 27-8, (1978).

*Primary Examiner*—Leo H. Boudreau
*Assistant Examiner*—Jacqueline Todd

*Attorney, Agent, or Firm*—Lowe, Price, LeBlanc, Becker & Shur

[57] ABSTRACT

In order to define the contour of an ellipse, it is necessary to determine five unknown parameters in the general equation representative of centered conics. When directly applying Hough transformation method to the above equation, since a five-dimensional space is required, it is practically impossible to detect an ellipse because a long processing time and a great amount of memory capacity are inevitably required. To overcome these problems, the geometric properties of an ellipse are determined separately on three parameter subspaces obtained on the basis of edge vector field: two-dimensional center histogram and two-dimensional (H, B) histogram, one-dimensional C histogram. A peak value on the center histogram represents a group of ellipse having the same center locations; a peak value on the (H, B) histogram represents a group of concentric ellipse having the same eccentricity and axis slope; a peak value on the C histogram defines a single ellipse. By sequentially selecting these peaks in the three subspaces, it is possible to define geometric properties of an ellipse under practical processing conditions. In order to define a plurality of ellipses efficiently, several novel methods have been adopted: separation of the rotation directions of edge vector field, recovery of edge vectors having no mate edge vectors; adoption of least mean square method, etc., in particular.

18 Claims, 18 Drawing Figures

SYMMETRICAL AXES

CENTER LOCATIONS

CENTER HISTOGRAM

EDGE VECTORS

COUNTERCLOCKWISE

CLOCKWISE

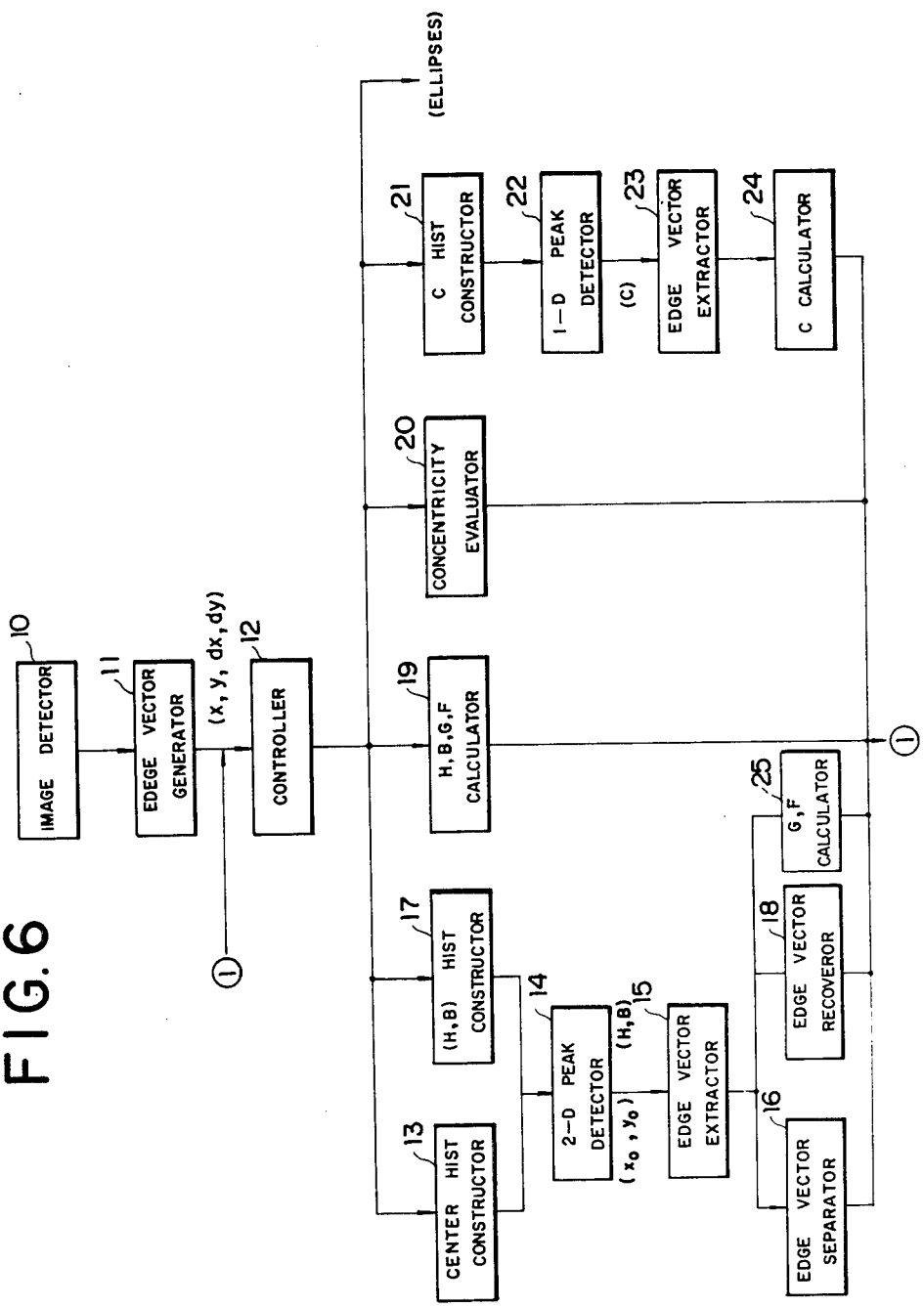

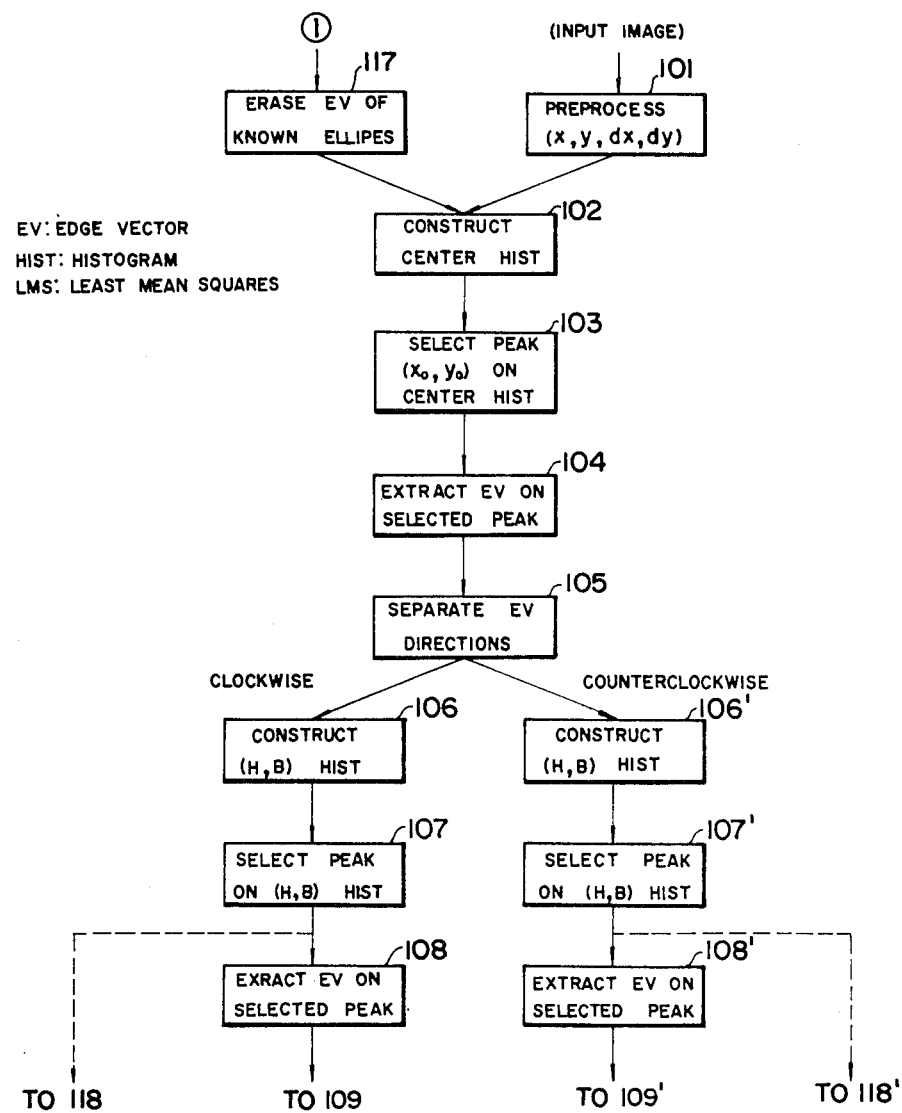

METHOD AND SYSTEM FOR DETECTING ELLIPTICAL OBJECTS

BACKGROUND OF THE INVENTION

1. Field of the Invention

The present invention relates generally to a method and system for detecting at least one elliptical object and more specifically to a method and system for detecting or defining at least one elliptical contour on an image plane on the basis of an edge vector field.

2. Description of the Prior Art

It is indispensable to reliably detect various geometrical shapes or contours of various objects on an image plane, when automatically inspecting or assembling machine parts in mass production processes. Machine parts are usually circular in shape; however, when projected on an image plane, the contours thereof are generally elliptical in shape.

Various methods of detecting elliptical shapes or contours have been proposed, being roughly classified into two categories of tracking methods and Hough transformation methods. In either method, the elliptical contour is detected on the basis of an edge image obtained by partially differentiating the brightness at edge portions of an object, where the brightness usually changes in the direction from dark image to bright image or vice versa.

In the tracking method, edge image elements are first detected on an image plane; the adjacency degree of edge image elements and the resemblance degree of edge image element directions are evaluated to determine a sequence of edge points; and an elliptical equation is defined on the basis of the determined point sequence. This method has an advantage such that it is possible to detect the contour of an ellipse even when a part thereof is covered by other parts; however, there exist shortcomings such that when an ellipse is divided into several segments, the divided single ellipse is recognized as several different ellipses because the edge points evaluated locally on the contour of an ellipse to be detected are only linked sequentially. Additionally, this method is subjected to a harmful influence of noise. For more detailed information, refer to to "Y. Nakagawa and A. Rosenfeld: A Note on Polygonal and Elliptical Approximation of Mechanical Parts" Pattern Recognition Vol. 11 pp. 133-142. Pergamon Press LTd. 1979 in Great Britain.

In the Hough transformation method, the edge image elements are mapped onto a space whose axes are defined by parameters representing the geometric properties of ellipses. However, since five unknown coefficients are included in the general equation of centered conics, if these coefficients are simply assigned as the space parameters, the necessary processing steps are enormous from the practical standpoint. In other words, a long processing time and a great amount of memory capacity are inevitably required.

To overcome the above problem, a modified Hough transformation method has been proposed, in which two-dimensional parameter spaces are introduced on the basis of geometric properties of ellipses in order to reduce processing time and memory capacity. However, this method is restricted to the detection of only almost complete ellipses. Additionally, there exist shortcomings such that long straight edge images should be eliminated previously and further it is rather difficult to completely eliminate points irrelevant to ellipses; that is, it is impossible to detect ellipses on an image plane including a great number of noise. For more detailed information, refer to to "S. Tsuji and F. Matsumoto: Detection of Ellipses by a Modified Hough Transformation," IEEE Trans. on Comput., C 27-8, 777/781 (1978).

SUMMARY OF THE INVENTION

With these problems in mind, therefore, it is the primary object of the present invention to provide a practical method and system for detecting at least one elliptical object on an image plane. In the method and system according to the present invention, the edge image of the contour of an ellipse is regarded as a two-dimensional edge vector field and Hough transformation method is applied to the edge vector field in order to define the geometric properties an ellipse. The features of the method and system according to the present invention is to decompose the five-dimensional Hough transformation space into three one- or two-dimensional sub-spaces: two-dimensional center histogram space, two-dimensional (H, B) histogram space, and one-dimensional C histogram space. A peak value on the center histogram represents a group of ellipses having the same center locations; a peak value on the (H, B) histogram represents a group of concentric ellipses having the same eccentricity and axis slope; a peak value on the C histogram represent a single ellipse. By sequentially selecting these three peaks on the three sub-spaces, it is possible to define geometric properties of an ellipse under practical processing conditions.

Further, it is the other object of the present invention to provide a method and system for detecting a plurality of elliptical objects accurately and efficiently, in which the edge vector field is separated according to the rotation directions thereof to distinguish a ring-shaped elliptical object; edge vectors having no mate edge vectors are recovered or relieved in estimating coefficients to increase the number of data to be sampled; least mean square method is adopted to estimate each coefficient statistically, etc.

To achieve the above-mentioned object, the method of detecting an elliptical object according to the present invention comprises the following steps of: (a) detecting the edge image brightness I of an elliptical object; (b) partially differentiating the detected edge image brightness I; (c) obtaining an edge vector field $\vec{n}$ (x, y, dx, dy) perpendicular to the edge image gradient I in such a direction that the bright image will always be on the one-hand side; (d) constructing a center histogram on a two-dimensional space; (e) selecting a center peak value ($x_o$, $y_o$) from the center histogram; (f) extracting the edge vectors supporting the centered conics having the selected peak center; (g) constructing an (H, B) histogram for the edge vector field in accordance with Hough transformation method; (h) selecting an (H, B) peak value located within a specific range $H^2-B<0$ on the (H, B) histogram, (i) estimating coefficients G, F of an ellipse group having the same center; (j) constructing a one-dimensional C histogram by calculating the coefficient C; and (k) selecting a C peak value on the C histogram.

To achieve the above-mentioned object, the system for detecting an elliptical object according to the present invention comprises: (a) means for transducing optical energy representative of edge image brightness I of an elliptical object into electric image signals; (b) means for generating an edge vector field $\vec{n}$ by partially differentiating the edge image signal I and by calculating the edge vector field perpendicular to the edge image gradient I in such a direction that the bright image will always be on the one-hand side; (c) means for outputting command signals to sequentially control the processing procedure of the entire system; (d) means for constructing a two-dimensional center histogram by extracting all pairs of mate edge vectors and by calculating all midpoints therebetween; (e) means for detecting a center peak value $(x_o, y_o)$ on the center histogram; (f) means for extracting all the edge vectors supporting the centered conics having the detected center peak value; (g) means for constructing an (H, B) histograms in accordance with Hough transformation method; (h) an (H, B) peak value on each (H, B) histogram being detected by the peak value detecting means, independently, within a predetermined range $H^2 - B < 0$; (i) means for calculating coefficients G, H; (j) means for constructing a C histogram; and (k) means for detecting a C peak value on the C histogram.

To achieve the above-mentioned object, the method of detecting a plurality of elliptical objects according to the present invention additionally comprises the following steps of (a) separating the extracted edge vectors into clockwise-rotating vectors and counterclockwise-rotating vectors; (b) constructing an (H, B) histogram for clockwise-rotating edge vector field; (c) evaluating the concentricity of the two separated concentric ellipse groups; (d) if the two concentric ellipse groups are determined to be a single ellipse group, constructing a one-dimensional C histogram by calculating the coefficient C; (e) if the two concentric ellipse groups are determined to be two and different ellipse groups, constructing each C histgram separately for each ellipse group by calculating each coefficient C; (f) selecting each C peak value on each C histogram separately; (g) erasing all the edge vectors supporting the detected ellipses from the originally-detected edge vector field; and (h) repeating the above steps to detect a plurality of ellipses one by one.

To achieve the above-mentioned object, the system of detecting a plurality of elliptical objects according to the present invention further comprises (a) means for separating the extracted edge vectors into clockwise-rotating vectors and counterclockwise-rotating vectors; and (b) means for evaluating the concentricity of two estimated concentric ellipse groups.

BRIEF DESCRIPTION OF THE DRAWINGS

The features and advantages of the method and system for detecting at least one elliptical object according to the present invention will be more clearly appreciated from the following description taken in conjunction with the accompanying drawings:

FIG. 6 is a schematic block diagram showing an exemplary configuration of the system of the present invention; and FIGS. 7(a) and 7(b) provide a flowchart showing an exemplary image processing procedure of the system of the present invention.

DETAILED DESCRIPTION OF THE PREFERRED EMBODIMENTS

Figure 1:
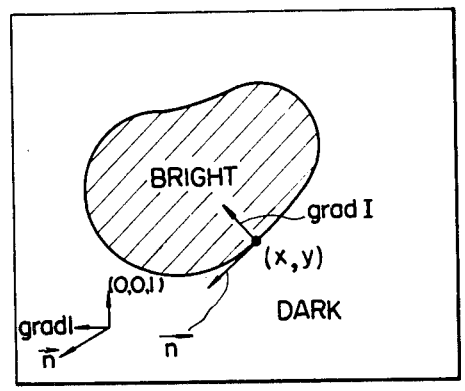
FIG. 1 is an illustration for assistance in explaining the relationship between edge image gradient I and edge vector.

To facilitate understanding of the present invention, a brief reference will be made to the basic geometric properties of centered conics including ellipses, hyperbolas and parabolas from the standpoint of analytical geometry.

The general equation of centered conics can be expressed on an x-y coordinate plane as follows:

$$ax^2 + 2hxy + by^2 + 2gx + 2fy + c = 0 \quad (1)$$

where a, h, b, g, f, and c are all constant coefficients. Here, the above equation (1) represents parabolas if $ab - h^2 = 0$, ellipses if $ab - h^2 > 0$, and hyperbolas if $ab - h^2 < 0$.

The equation (1) can be expressed as follows when each coefficient is normalized with respect to a $(a \neq 0)$:

$$x^2 + 2Hxy + By^2 + 2Gx + 2Fy + C = 0 \quad (2)$$

It is of course possible to directly determine the above five coefficients in accordance with Hough transformation method from the theoretical standpoint. However, since a five-dimensional Hough transformation processing is necessary, this method is practically impossible because a great number of memory units and a long processing time are inevitably required. The gist of the present invention is to decompose the five-dimensional Hough transformation space into three sub-spaces on the basis of an edge vector field as described later in greater detail.

If $H^2 - B \neq 0$, since the above equation (2) represents a centered conic, there exists a single center. Now, when the locations of the center is assumed as $(x_o, y_o)$, the above equation (2) can be rewritten as:

$$X^2 + 2HXY + BY^2 + C' = 0 \tag{3}$$

where $X = x - x_o$, $Y = y - y_o$ and $C'$ is a constant coefficient. The expression (3) represents a group of centered conics which include ellipses and hyperbola having a common center $(x_o, y_o)$.

When partially differentiated with respect to X and Y, the above equation (3) can be expressed as:

$$XdX + H(YdX + XdY) + BYdY = 0 \tag{4}$$

The above equation (4) represents a vector field of differential coefficient (tangent) vectors of a group of centered conics having a common center $(x_o, y_o)$. That is, the equation (4) represents an edge vector field of centered conics, as described later in greater detail. If H and B are determined and $H^2 - B < 0$ is held, it is possible to determine a group of ellipses having the same center and the same orientation (slope of axis); in other words, a group of concentric ellipses. Therefore, an ellipse can be defined finally by determining C of equation (2), which defines the size of an ellipse.

The coefficient C can be expressed from equation (2) as follows:

$$C = -x^2 - 2Hxy - By^2 - 2Gx - 2Fy \tag{5}$$

where $G = -x_o - Hy_o$ and $F = -Hx_o - By_o$.

Therefore, the aforementioned three sub-spaces are (1) a two-dimensional center $(x_o, y_o)$ histogram space; (2) a two-dimensional (H, B) histogram space; and (3) a one-dimensional C histogram space.

There is described hereinbelow the principle of the method of detecting the contour of an ellipse existing on an image plane on the basis of a two-dimensional edge vector field according to the present invention.

With reference to FIG. 1, the method of defining edge vectors $\vec{n}$ which determine the contour of an ellipse will be described. The first-order derivatives of image brightness I with rrespect x and y at edge points along the contour of an ellipse on an image plane are given as $$\text{grad } I = (\partial I/\partial x, \partial I/\partial y) \tag{6}$$

The above grad I represents a gradient of edge image brightness. Points where the absolute value of grad I exceeds a threshold level are determined to be the edges of an object on an image plane.

At the edge points, a unit vector n (referred to as an edge vector, hereinafter) is defined by the following expressions:

$$\text{grad } I \cdot \vec{n} = 0 \tag{7}$$

$$\text{grad } I \times \vec{n}/|\text{grad } I \times \vec{n}| = (0, 0, 1) \tag{8}$$

where $\vec{n} = (n_x, n_y)$ and $|\vec{n}| - 1$

Since the inner product of two vectors $\overline{A}$ and $\overline{B}$ represents $|A||B| \cos \theta$ ($\theta$ is an angle subtended by $\overline{A}$ and $\overline{B}$), the above equation (7) indicates that $\vec{n}$ is perpendicular to grad I.

Since the outer product of two vectors $\overline{A}$ and $\overline{B}$ has a direction perpendicular to a plane including $\overline{A}$ and $\overline{B}$, the above equation (8) represents a three-dimensional vector in a space including an image plane and an axis perpendicular thereto. This equation (8) defines that the bright image will always be on the right-hand side as viewed in the direction of the vector n and accordingly, the dark image will always fall on the left-hand side. In summary, the edge vector n is so determined as to form a right-handed orthonormal system in relation to grad I. Therefore, it is possible to determine the contour of an ellipse by extracting the edge vectors n defined by the expressions (6), (7) and (8).

The above edge vector n is so defined as to rotate in the clockwise direction around an object. However, if the expression (8) is $$\text{grad } I \times n/|\text{grad } I \times n| = (0, 0, -1) \tag{8}'$$

this indicates that the edge vector n is so defined as to rotate in the counterclockwise direction around an object; that is, the edge vector n is so determined as to form a left-handed orthonormal system in relation to grad I.

Figure 2A:
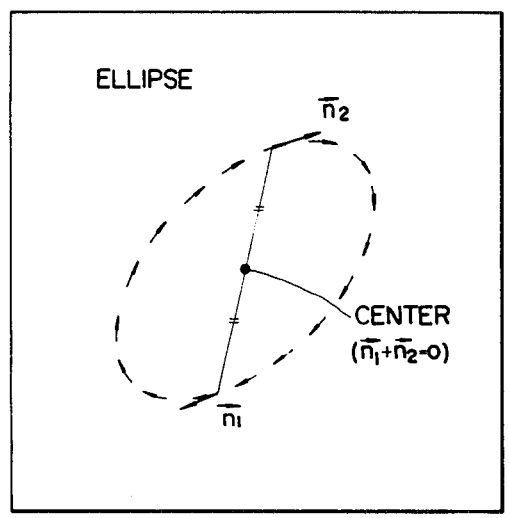
FIG. 2(a) is an illustration for assistance in explaining the relationship between a center of an ellipse and edge vectors.
Figure 2B:
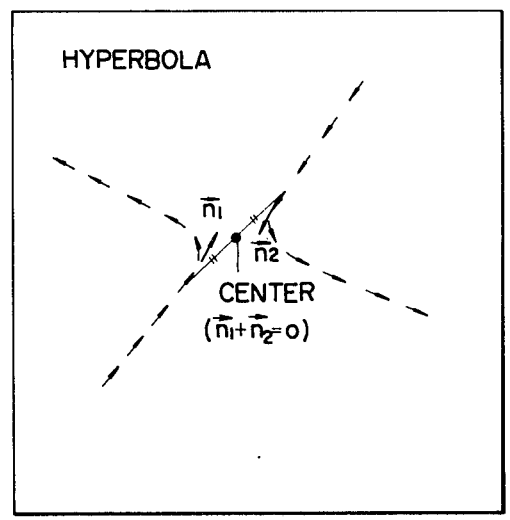
FIG. 2(b) is an illustration for assistance in explaining the relationship between a center of a hyperbola and edge vectors.
Figure 2C:
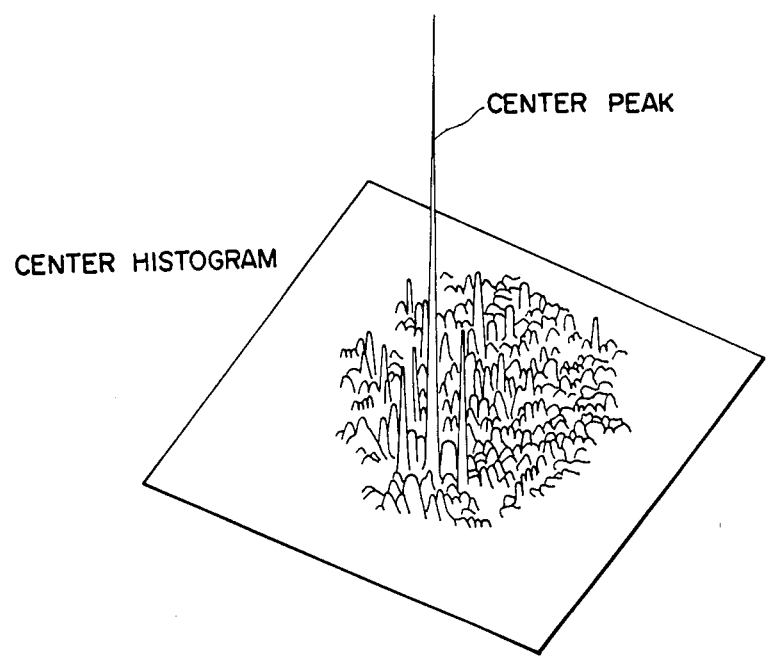
FIG. 2(c) is a perspective view showing a great number of center peak values on a center histogram.

With reference to FIGS. 2(a), 2(b) and 2(c), the method of determining a center of a centered conic will be described hereinbelow. The center of a centered conic is obtained by two edge vectors under the following conditions:

$$n_1 + n_2 = 0 \tag{9}$$

This is because two edge vectors $\vec{n}_1$ and $\vec{n}_2$ have opposite directions to each other, when located symmetrically with respect to its center of an centered conic. Therefore, it is possible to estimate the center of a centered conic by extracting every pair of two mate edge vectors $\vec{n}_1$ and $\vec{n}_2$ satisfying the above expression (9) from the edge vector field, by calculating the midpoints of the two mate edge vectors, and by constructing a two-dimensional center histogram of the calculated midpoints. Points at which peak values stand are candidates of the center of centered conics. Although a number of peaks may be obtained as shown in FIG. 2(c), in practice, a point having a maximum peak value is considered as a presumed center point. The above histogram is called a center histogram hereinafter.

It should be noted that the center appears, as shown in FIG. 2(a), in the case of an ellipse but as shown in FIG. 2(b) in the case of a hyperbola. In general, a center of an ellipse appears when two focuses thereof lie within a bright image; however, a center of a hyperbola appears when two focuses thereof lie within a bright image and other portions thereof lie on a dark image. Therefore, it is impossible to discriminate an ellipse from a hyperbola by only constructing the center histogram in accordance with the equation (9).

In FIG. 2(c), there exist a great number of peaks. These peaks can be classified into three categories: (1) real peaks caused by centered conics with the same center, (2) spurious peaks caused by the interaction between the contours of two or more centered conics with different centers, and (3) irrelevant peaks coincidentally caused by the contours of non-conic objects.

This method of determining the center of a centered conic serves to reduce the number of the unknown coefficients of a centered conic. In more detail, the equation (2) includes five unknown coefficients of H, B, G, F and C. However, once the center ($x_o$, $y_o$) is determined, the unknown coefficients are reduced into three of H, B and C' as understood by the equation (3).

With reference to FIGS. 3(a)–3(f), the method of determining coefficients H and B in expression (4) will be described hereinbelow, in which Hough transformation method is adopted. The expression (4) $XdX+H(YdX+XdY)+BYdY=0$ represents a vector field of differential coefficient (tangent) vectors of a group of centered conics. Since the edge vector $\vec{n}$ on the contour of an object is tangent to the boundary thereof, the relation $nx/dX=ny/dY$ is held. Therefore, the edge vector field of an ellipse is equivalent to the tangent vector field given by expression (4), except that the edge vector field has a specific rotation direction determined by the difference in brightness between the ellipse region and the background. In other words, it is possible to consider that the expression (4) represents an edge vector field along a centered conic. Further, the values X, Y, dX and dY all can be obtained on the basis of edge images, because (X, Y) are locations thereof and (dX, dY) are directions thereof. On the basis of the calculated values, X, Y, dX and dY, it is possible to apply Hough transformation method to a two-dimensional space having coordinates of H and B, as described below in greater detail.

Figure 3A:
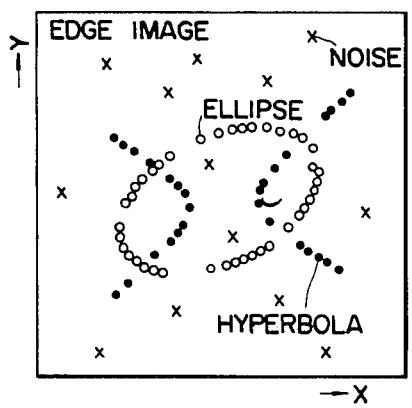
FIG. 3(a) is an illustration showing edge images, where an ellipse is represented by small circles, a hyperbola is represented by small dots, and noise images are represented by x.

FIG. 3(a) illustrates an edge vector field of an ellipse (shown by small circles), an edge vector field of a hyperbola (shown by dots) and noise (shown by x), respectively on an image plane. It is assumed that these edge vector fields of the ellipse and hyperbola support the peak values obtained on the center histogram.

Here, the expression (4) is rewritten by dividing it by (YdY) as follows:

$$Q+HP+B=0 \quad (10)$$

where $P=(YdX+XdY)/YdY$ and $Q=XdX/YdY$

Figure 3B:
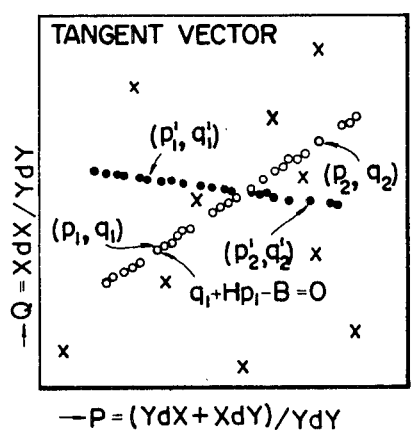
FIG. 3(b) is an illustration showing a (p, q) space on which edge vectors on the edge images are mapped to form a first straight line for each edge vector field of the ellipse or the hyperbola.

Since P and Q are both obtained by observing edge image values (locations X, Y and directions dX, dY), if these edge vectors lie on the contour of a centered conic, the observed edge image values ($p_1$, $q_1$), ($p_2$, $q_2$), ... or ($p'_1$, $q'_1$), ($p'_2$, $q'_2$) ... must be arranged on the linear equation: $Q+HP+B=0$ as shown in FIG. 3(b), in which the straight line illustrated by circles corresponds to the ellipse shown in FIG. 3(a) and the straight line illustrated by dots corresponds to the hyperbola shown in FIG. 3(a). In other words, a plurality of the observed edge values (X, Y, and dX, dY) can be mapped onto a straight line on a two-dimensional (P, Q) space. Therefore, in the case of the ellipse, the following equations can be obtained on at each point of the straight line the (P, Q) space:

$$\left. \begin{array}{l} q_1 + Hp_1 + B = 0 \\ q_2 + Hp_2 + B = 0 \\ \ldots \end{array} \right\} \quad (11)$$

in the case of the hyperbola, the following equations can be obtained at each point of the straight line on the (P, Q) space:

$$\left. \begin{array}{l} q'_1 + Hp'_1 + B = 0 \\ q'_2 + Hp'_2 + B = 0 \\ \ldots \end{array} \right\} \quad (12)$$

When the expressions (11) and (12) are further rewritten, the following expressions can be given as:

$$\left. \begin{array}{l} B' = p_1H' + q_1 \\ B' = p_2H' + q_2 \\ \ldots \end{array} \right\} \quad (13)$$

or $$\left. \begin{array}{l} B'' = p'_1H'' + q'_1 \\ B'' = p'_2H'' + q'_2 \\ \ldots \end{array} \right\} \quad (14)$$

Figure 3C:
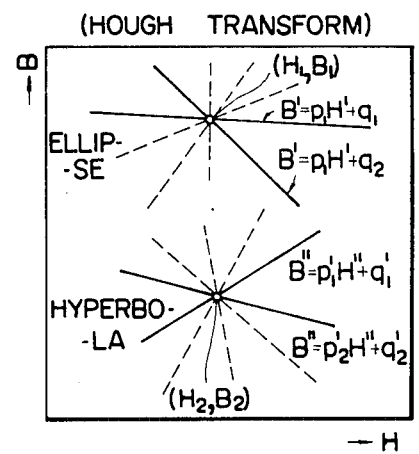
FIG. 3(c) is an illustration showing an (H, B) space on which each point on the first straight line is mapped to form a plurality of second straight lines corresponding to each edge vector on the contour of the ellipse or the hyperbola, for assistance in explaining Hough transformation method.

The above expressions (13) and (14) indicate linear equations with respect to B' and H' or B'' and H'', respectively. Therefore, it is possible to obtain an intersection ($H_1$, $B_1$) of an ellipse on the basis of expressions (13) and an intersection ($H_2$, $B_2$) of a hyperbola on the basis of expressions (14) on two two-dimensional (H, B) space, respectively, as shown in FIG. 3(c).

Figure 3D:
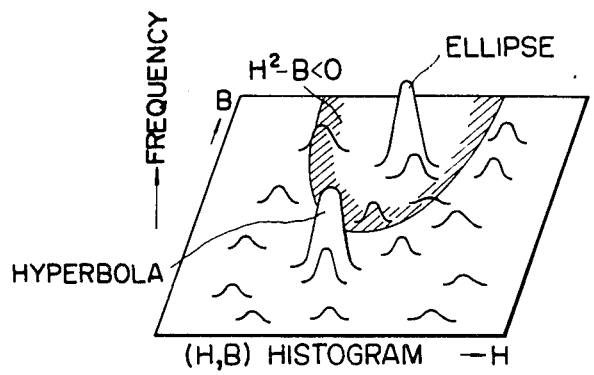
FIG. 3(d) is a perspective view showing an (H, B) histogram and a range of ellipses $(H^2 - B < 0)$.

The above Hough transformation is implemented for each observed edge value and therefore, a number of intersections are calculated to obtain a histogram as shown in FIG. 3(d). This histogram is called an (H, B) histogram hereinafter. FIG. 3(d) shows two peak values which correspond to the ellipse and the hyperbola, respectively. On the basis of the (H, B) histogram, it is possible to determine the coefficients H and B respectively. The above implementations are effective for detecting any centered conics including hyperbolas.

The above processes described so far does not exclude hyperbolas. A hyperbola divides the image into three regions on the image plane. When the brightness changes across these regions in a specific order, the condition of expression (9) $\vec{n}_1+\vec{n}_2=0$ holds for the edges on the boundary of a hyperbola. The necessary step for further detecting an ellipse is to use the condition $H^2-B<0$, the range $R_1$ of which is illustrated by shaded portion in FIG. 3(d).

Figure 3F:
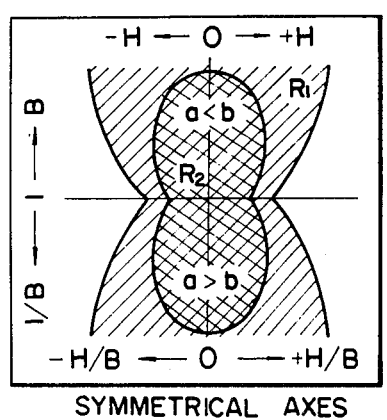
FIG. 3(f) is an illustration showing another (H, B) space having symmetrical axes, in which the ranges $R_1$ and $R_2$ are defined symmetrically with respect to $B = 1$ and $H = 0$.
Figure 3E:
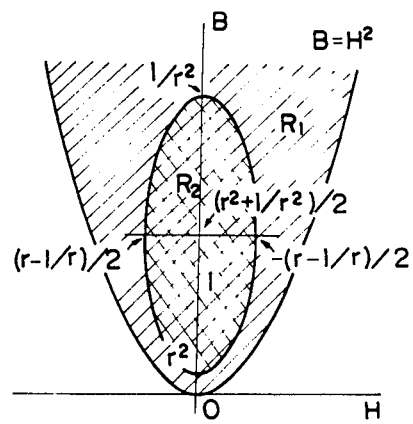
FIG. 3(e) is an illustration showing a (H, B) space, in which a range $R_1$ of theoretical ellipses $(H^2 - B < 0)$ and a range $R_2$ of practical ellipses $(0.2-0.3 < r = b/a < 1)$ are illustrated.

FIG. 3(e) shows the above region $R_1$ in which $H^2-B<0$ is satisfied and another region $R_2$. The region $R_2$ is determined on the basis of the practical shapes of elliptical mechanical parts. In greater detail, it is possible to assume that the ratio r of minor ellipse axis (b) to major ellipse axis (a) in length lies within the following range in practice:

$$0.2\text{–}0.3 \leq r = \frac{\text{Minor ellipse axis length } (b)}{\text{Major ellipse axis length } (a)} \leq 1 \quad (15)$$

The above inequality can be rewritten by H and B as follows, which represents an elliptical range $R_2$ shown by cross hatches in FIG. 3(e)

$$\frac{H^2}{\frac{1}{4} \cdot \frac{(r^2-1)^2}{r^2}} + \frac{\left\{B - \frac{1}{2}\left(r^2 + \frac{1}{r^2}\right)\right\}^2}{\frac{1}{4}\left(r^2\frac{1}{r^2}\right)^2} < 1 \quad (16)$$

By determining the above condition (15) or (16) as a practical ellipse range, it is possible to greatly economize the capacity of necessary memory unit and to markedly reduce the time required for data processing.

Further, FIG. 3(f) shows a more preferable (H, B) coordinate having symmetrical axes, in which the ordinate is separated into B and 1/B on both the sides of B=1 and the abscissa is represented by H/B in the third and fourth quadrants. This is because since coefficients H and B are normalized with respect to a as expressed by expression (2), the relationship between major axis length a and the minor axis length b of an ellipse is reversed on both the sides of B=1. In other words, it is preferable to maintain a symmetrical relationship in length between two coefficients a and b.

The ellipses which have the same center and orientation but different coefficient C (size) are concentric. The edge vector field extracted on the basis of the two preceding center and (H, B) histograms is an elliptical vector field corresponding to several cencentric ellipses.

After the parameters B and H have been determined, it is rather easy to determine the remaining coefficient C representative of ellipse size on the basis of expression (5), because all the coefficients H, B, G, F ($G = -x_o - Hy_o$, $F = -Hx_o - By_o$) have been decided. A one-dimensional histogram is similarly constructed on the basis of the edge location data (X, Y) of edge vector. The above histogram is called a C histogram hereinafter. A peak value on the C histogram determines a value of C.

As described aove, three histograms: center histogram, (H, B) histogram and C histogram are constructed in three sub-spaces in order to obtain the respective peak value, that is, each ellipse's coefficient H, B, G, F, C. The above three histograms correspond to the partial parameter spaces of five-dimensional parameter spaces.

The description has been made of the method of detecting a single elliptical object. However, the feature of the present invention is to accurately detect a plurality of elliptical objects. The relationship between a plurality of peak values on the center histogram and a plurality of elliptical contours is described hereinbelow.

Figure 4A:
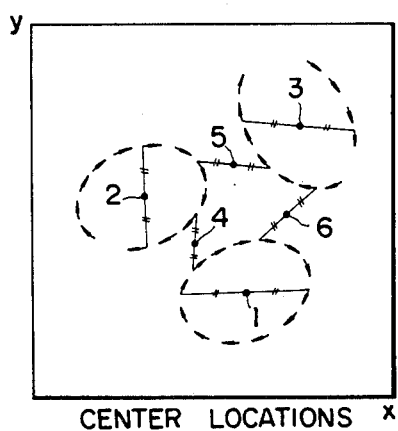
FIG. 4(a) is an illustration for assistance in explaining the presence of a plurality of spurious centers caused by a plurality of ellipses.
Figure 4B:
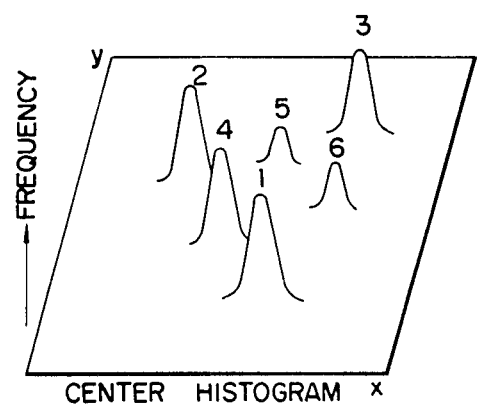
FIG. 4(b) is a perspective view of a center histogram showing three ellipse centers and three spurious centers.

FIGS. 4(a) shows three ellipses on an image plane and six centers obtained in accordance with the expression (9) $\vec{n_1} + \vec{n_2} = 0$. Since there are six peak values on the center histogram as shown in FIG. 4(b), it seems that there are six different centered conics having six different centers. The three centers 1, 2, and 3 of three ellipses in FIG. 4(a) corresponds to the three peak values 1, 2 and 3 on the center histogram. However, other additional centers 4, 5 and 6 are the ones obtained when determining the midpoints of two mate edge vectors on the basis of expression (9) $\vec{n_1} + \vec{n_2} = 0$. The points such as 4, 5, and 6 are called spurious centers, which are produced by the mutual interference between a plurality of the contours of ellipses. The edge vectors which support such spurious centers scarcely have significant peak values on other histograms obtained thereafter. However, it is important to eliminate such spurious centers before implementing the succeeding processing in order to enhance the efficiency of data processing. Since the group of spurious center peak values usually appear at the middle of a group of outer peak values on the center histogram, it is desirable to preferentially process the peak values located near a group of outer peak values. In the method according to the present invention, when K denotes the number of peak values; G denotes the center of gravity of a group of peak values; and $r_1, r_2 \ldots, r_i, \ldots, r_k$, denote location vectors from the gravity center G to each peak value, a peak value the farthest from the gravity center G, that is, a peak value having the maximum $|r_i|$ is first selected. In the case where the edge vectors supporting the first center peak value on the center histogram have a corresponding peak value on the (H, B) histogram, since this indicates that these edge vectors include a great number of edge images distributed on a centered conic to be detected, it is possible to determine that the selection of the first center peak value on the center histogram is correct. In such case, the selected and appropriately-processed edge vectors are eliminated from the edge image and then another center histogram is newly constructed again to select the next peak value having the max $|r_i|$. By eliminating the edge vectors already detected, it is possible to reduce the number of spurious peak values in geometric progression.

However, in the case where the edge vectors supporting the first center peak value selected on the newly constructed center histogram are not distributed on the contour of a centered conic, the second peak value is selected on the basis of an empirical formula determined as follows:

$$\max_i (|r_i| + |r_i - r_p|) \tag{17}$$

where $r_p$ denotes a location vector of the peak value selected first on the center histogram.

The above expression (17) indicates that a peak value having a maximum sum of a distance $|r_i|$ to the gravity center G and a distance $|r_i - r_p|$ to the peak value already selected is to be selected next. Further, when the second peak value is rejected as not being a correct center of a centered conic to be detected, the above implementation is repeated on the basis of the expression (17) to select the third peak value including edge vectors distributed on the contour of another centered conic. The above implementation makes it possible to efficiently detect a plurality of ellipses, since all the center peak values including spurious peak values are not checked as to whether the edge vectors supporting the peak values are distributed on the contours of centered conics and therefore since the number of edge vectors rejected on the (H, B) histogram is reduced markedly.

In summary, several peaks on the center histogram suggest the presence of several centered conics with different centers. Therefore, the most prominent peak is first selected on the center histogram, and the edge vector field supporting the selected peak is extracted from the edge image. Thereafter, the edge vector field is further analyzed to construct the (H, B) and C histograms. Once the edge vector field is determined to contain an ellipse, the edged vectors corresponding to the detected ellipse are all eliminated from the original edge image. A new center histogram for the updated edge image is constructed again to find other ellipses. Otherwise, another candidate peak is selected on the same center histogram where the previous selection has been completed.

Further, a plurality of peak values on the (H, B) histogram indicate that there exist a plurality of centered conics having the same center but different eccentricities and different orientations (the slope of axis). Therefore, once the coefficients H and B have been determined by a peak value on the (H, B) histogram, the center, the eccentricity and the orientation of an ellipse are all determined. In other words, a plurality of concentric ellipses are detected. The remaining unknown coefficient is C which represents the size of an ellipse and should be determined on the C histogram.

Before constructing the C histogram, the following procedure is additionally implemented for more effectively detecting a plurality of concentric ellipses. An elliptical edge vector field has a rotation direction about its center. An effective procedure to detect ring-shaped objects is to divide the C histogram into two sub-histograms: clockwise-rotating edge vector C histogram and counterclockwise-rotating edge vector C histogram.

Figure 5A:
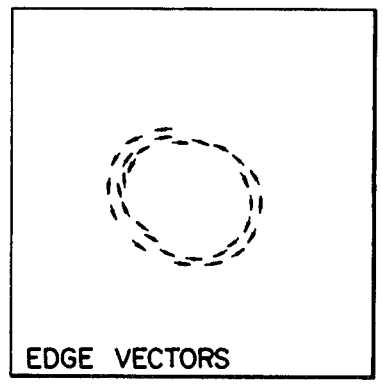
FIG. 5(a) is an illustration showing two close ellipses having almost the same center and axis slope.
Figure 5B:
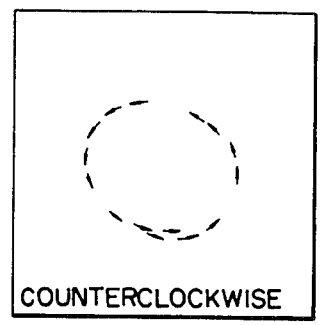
FIG. 5(b) is an illustration showing one ellipse shown in FIG. 5(a), which is represented by counterclockwise-rotating edge vectors.
Figure 5C:
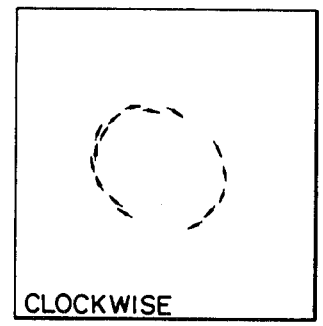
FIG. 5(c) is an illustration showing the other ellipse shown in FIG. 5(a), which is represented by clockwise-rotating edge vectors.

With reference to FIGS. 5(a) to 5(c), the method of separating a plurality of concentric ellipses having almost the same coefficient C will be described hereinbelow. The concentric ellipses have a single peak value on the (H, B) histogram, but a plurality of peak values on the C histogram. By selecting these peak values on the C histogram, it is possible to discriminate all the concentric ellipses. However, when two concentric ellipses are located close to each other as shown in FIG. 5(a), it is possible to more efficiently distinguish the two concentric ellipses by constructing two C sub-histograms corresponding to clockwise- and counterclockwise-rotating edge vectors, as already explained. This is the first method of efficiently discriminate a plurality of concentric ellipses.

Further, it is more preferable to employ the second method as follows: In concentric ellipses, the coefficients H, B, G, F of expression (2) are all the same. However, when these coefficients are estimated on the method of least mean squares (described later) after separating the concentric ellipses close to each other in clockwise and counterclockwise directions, the estimated values sometimes deviate from real values. Therefore, according to the present invention, the concentricity of ellipses on edge vector field is further evaluated in accordance with the following empirical expression:

$$U = W_1 \cdot (\Delta x^2 + \Delta y^2) + W_2 \cdot \Delta \Theta^2 \qquad (18)$$

$$\Delta x = x_2 - x_1, \Delta y = y_2 - y_1, \Delta \Theta = \Theta_2 - \Theta_1$$

where $(x_1, y_1)$ represents a center of an ellipse corresponding to a clockwise edge vector field; $(x_2, y_2)$ represents a center of an ellipse corresponding to a counterclockwise edge vector field; $\theta_1$ represents the slope of the axis or orientation of the ellipse corresponding to the clockwise edge vector field; $\theta_2$ represents the slope of the axis of the ellipse corresponding to the counterclockwise edge vector field; $W_1$ and $W_2$ represent weight coefficients, being determined as $W_1 = (2\pi)^2$ and $W_2 = (N/2)^2$ where N denotes the size of an image, that is, $N^2$ denotes the number of image elements. In summary, the above empirical expression U indicates the difference between two close concentric ellipses in center location and orientation.

When this U is below a predetermined threshold, two edge vector fields are determined to be equivalent. Once determined to be equivalent, two clockwise and counterclockwise edge vector fields are merged as one edge vector field to estimate each coefficient of an ellipse again on the method of least mean squares.

Further, it is also preferable to separate the edge vectors into a clockwise-rotating vector field and a counterclockwise-rotating vector field after the center histogram has been constructed and before the (H, B) histogram will be constructed. In this case, the (H, B) histogram is divided into the two sub-histograms: clockwise-rotating edge vector (H, B) histogram and counterclockwise-rotating edge vector (H, B) histogram.

In order to enhance the detecting precision, it is preferable to adopt a statistical method of least mean squares. In this case, the coefficients of an ellipse are not directly determined by the peak values on the three histograms: center histogram, (H, B) histogram and C histogram. The method of least mean squares is applied to the edge image vectors contributed to the peak values on these three histograms.

With respect to the edge vector field extracted on the basis of peak values on the center histogram and (H, B) histogram, the coefficients H, B, G, F are determined again so that the following expression $Q_1$ is minimized:

$$Q_1 = \sum_i \{x_i dx_i + H(y_i dx_i + x_i dy_i) + By_i dy_i + Gdx_i + Fdy_i\}^2 \qquad (19)$$

The expression within the bracket is obtained by partially differentiating the expression (2) or (5) with respect to x and y. This is because the expression (2) or (5) includes unknown coefficients G and F relative to center location $(x_o, y_o)$ (since $G = -x_o - Hy_o$ and $F = -Hx_o - By_o$) and B and H relative to eccentricity and orientation.

With respect to the edge vectors extracted on the basis of a peak value on the C histogram, the coefficient C is determined so that the following expression $Q_2$ is minimized:

$$Q_2 = \sum_i \{C + x_i^2 + 2\tilde{H}x_i y_i + \tilde{B}y_i^2 + 2\tilde{G}x_i + 2\tilde{F}y_i\}^2 \qquad (20)$$

The above expression within the bracket is equivalent to expression (5). Further, the labels $\tilde{H}, \tilde{B}, \tilde{G}, \tilde{F}$ designate known coefficient values already estimated by minimizing the above expression (19) or $Q_1$.

There exists a possibility that there exist a great number of edge vectors which are not extracted as the ones supporting the center of an ellipse, because there are no mate edge vectors satisfying the condition of expression (9) $\vec{n}_1 + \vec{n}_2 = 0$, in spite of the fact that these edge vectors are located on and along the contour of the ellipse. Therefore, it is effective to recover or relieve these edge vectors in order to increase the number of sampling points when minimizing the expression (19) or $Q_1$. Therefore, the edge vector fields which satisfy the following condition are recovered or relieved.

$$\frac{\vec{n}_p \cdot \vec{n}_t}{|\vec{n}_p| \cdot |\vec{n}_t|} = \cos\theta \geq 1.0 - \epsilon \qquad (21)$$

where $\vec{n}_p$ denotes edge vectors detected on an image plane; $\vec{n}_t$ denotes tangent vectors of a group of concentric ellipses determined by H and B corresponding to a peak value on the (H, B) histogram; $\theta$ denotes an angle subtended by the above two vectors; and $\epsilon$ denotes an appropriately-selected small positive value. Since the inner product of two vectors $\vec{A}$ and $\vec{B}$ is $|A||B|\cos\theta$, the above expression indicates that an angle subtended by $n_p$ and $n_t$ lies within an angle range between $\cos^{-1} 1.0$ and $\cos^{-1}(1.0-\epsilon)$. If $\epsilon=0.01$ in practice, the allowable angle range is $90\pm5°$. In other words, mate edge vectors the direction of which deviates within $\pm5$ degrees from the directions of other mate edge vectors are recovered as sampling data to increases the number of data.

In summary, edge vectors having no mate edge vectors are relieved as the edge image and added to the vector field which supports a peak selected on the (H, B) histogram if the angle difference between $\vec{n}_p$ and $\vec{n}_t$ is sufficiently small ($\pm5$ degrees).

With reference to FIG. 6, the system configuration of the present invention will be described hereinbelow.

An edge image detector 10 is an image pickup tube such as image orthicon or vidicon for transducing optical energy representative of edge image brightness I of elliptical objects into corresponding electric signals on an image plane (x, y).

An edge vector generator 11 partially differentiates a great number of detected image signals with respect to x and y to obtain edge image gradient I ($\partial I/\partial x, \partial I/\partial y$), extracts a number of first-order edge derivatives which exceeds a predetermined threshold, and calculates edge vector field $\vec{n}$ in accordance with algorithms (7) and (8) grad $I \cdot \vec{n} = 0$, grad $I \times \vec{n} = |$grad $I \times \vec{n}|(0,0,1)$. The calculated edge vectors $\vec{n}$ is perpendicular to the grad I in a right-handed orthonormal system so that the bright image will always be on the right-hand side. A sobel operator is adopted as the edge vector generator. In this embodiment, the size of an image plane is about $256\times256$ in image elements and each image element is represented by 8-bit gray levels. Further, the directions of the edge vectors are quantized (variables are divided into small quanta) into 2 degrees in the range from 0 to 360 degrees.

A controller 12 outputs command signals to control the sequential implementations or procedures of the system in order.

A center histogram constructor 13 extracts all pairs of two mate edge vectors which satisfy the algorithm (9) $\vec{n}_1 + \vec{n}_2 = 0$ and calculates a number of midpoints between two mate edge vectors in response to the outputs from the edge vector generator 11, that is, edge locations (x, y) and edge slopes (dx, dy) in order to construct a center histogram. As already described, since there exists a great number of small peaks, as shown in FIG. 2(c), irrelevant to real centers of ellipses or spurious centers, only the peaks beyond a predetermined threshold are selected. Further, in this center histogram constructor 13, a prominent peak having the maximum $|r_i|$ (the farthest from the gravity center G) is first selected.

A two-dimensional peak detector 14 detects the peak values (x, y) on the center histogram.

An edge vector extractor 15 extracts a number of edge vectors which support the first peak selected on the center histogram from the edge vector field.

An edge vector separator 16 separates the extracted edge vectors including close magnitude and direction into clockwise-rotating vector field and counterclockwise-rotating vector field.

A (H, B) histogram constructor 17 constructs an (H, B) histogram on the basis of the algorithm (4) $XdX+H(YdX+XdY)+BYdY=0$ and in response to edge locations (x, y) and edge slope (dx, dy) outputted from the edge vector generator 11 in accordance with Hough transformation method. To construct an (H, B) histogram, the values (x, y, dx, dy) are mapped onto a two-dimensional $(P=(YdX+XdY)/YdY, Q=XdX/dY)$ space to form a first straight line; all intersections of second straight lines corresponding to each mapped point on the first straight line are calculated in two-dimensional (H, B) space. A peak value on the (H, B) histogram is detected by the same two-dimensional peak detector 14. A number of edge vectors which support the peak selected on the (H, B) histogram are extracted from the edge vector field by the same edge vector extractor 15. Further, when detecting a peak value on the (H, B) histogram, the selectable range is restricted by the algorithm $H^2 - B < 0$ or $0.2 - 0.3 < r = b/a < 1$.

An edge vector recover 18 recovers or relieves all edge vectors having no mate edge vectors in accordance with the algorithm (21) $\vec{n}_p \cdot \vec{n}_t \geq (1.0-\epsilon)|\vec{n}_p| \cdot |\vec{n}_t|$. That is to say, mate edge vectors lying within $\pm5$ degrees in the direction of other mate edge vectors of a concentric ellipse group determined by H and B corresponding to the peak point on the (H, B) histogram are recovered or relieved to expand the edge vector field.

A coefficient H, B, G, F calculator 19 calculates coefficients H, B, G, and F on the basis of the edge location (x, y) and edge slope (dx, dy) and the center ($x_o$, $y_o$) and coefficients H and B in accordance with the algorithm (19) whereby $Q_1$ is minimized in accordance with least mean square method.

A concentricity evaluator 20 evaluates the concentricity of two estimated clockwise- and counterclockwise-rotating concentric ellipse groups having the same coefficients H, B, G, F in accordance with algorithm (18) $U = W_1(\Delta x^2 + \Delta y^2) + W_2\Delta\theta^2$, by which the differences in center locations and orientations are checked. The two edge vector fields separated by the edge vector field separator are determined to be two different concentric group when the differences are beyond a predetermined value and to be an equivalent concentric group when the differences are below the predetermined value. When determined to be an equivalent group, the estimated coefficients H, B, G, F are merged to construct a single C histogram again. When determined to be two different groups, two C histograms are constructed separately.

A C histogram constructor 21 constructs a C histogram in response to the outputs (x, y) from the edge vector generator 11 and the outputs ($x_o$, $y_o$, H, B) from the two-dimensional peak value detector 14 in accordance with algorithm (5) $C = -x^2 - 2Hxy - By^2 - 2Gx - 2Fy$, where $G = -x_o - Hy_o$ and $F = -Hx_o - By_o$ A one-dimensional peak detector 22 detects the peak values on the C histogram.

An edge vector extractor 23 extracts a number of edge vectors which supports the peak selected on the C histogram from the edge vector field.

A C calculator 24 calculates a coefficient C on the basis of determined coefficients $\bar{H}$, $\bar{B}$, $\bar{G}$, $\bar{F}$ in accordance with the algorithm (20) whereby $Q_2$ is minimized in accordance with least mean square method.

After a first ellipse has been detected, the system similarly detects other ellipses repeatedly. To detect the next ellipse the peak detector 14 selects the next prominent peak value having the maximum $|r_i|$. In the case where the edge vectors supporting the next prominent center peak value selected on the newly constructed center histogram are not distributed on the contour of a centered conic, the peak detector 14 selects a peak value having a maximum sum of a distance to the gravity center G and a distance to the first selected peak in accordance with algorithm $$\max_i (|r_i| + |r_i - r_p|). \tag{17}$$

The above-mentioned procedure to detect an ellipse is repeated at a high speed in response to command signals outputted from the controller 12. A plurality of ellipses on an image plane can be detected and distinguished from each other separately on the basis of the respective center $(x_o, y_o)$ and coefficients H, B, and C.

The above-mentioned system configuration is an example when all the coefficients of ellipses are determined in accordance with least mean square method. However, it is of course possible to directly determine the coefficients H, B, G, F, C on the basis of the respective peak values $(x_o, y_o, H, B, C)$ on the three histograms. In such cases, the H, B, G, F calculator 19, the edge vector extractor 23, and the C calculator 24 are all unnecessary. However, an additional G, F calculator 25 is required to calculate the coefficients G, F on the basis of the center peak value $(x_o, y_o)$ and coefficients (H, B) in accordance with algorithm $G = -x_o - Hy_o$, $F = -Hx_o - By_o$.

The system configuration according to the present invention has been described on the basis of discrete elements implementing various processing or operations in order to facilitate understanding of the present invention. However, in reality, a microcomputer is adopted for implementing the above-mentioned various processing and operations in accordance with appropriate software.

Figure 7B:
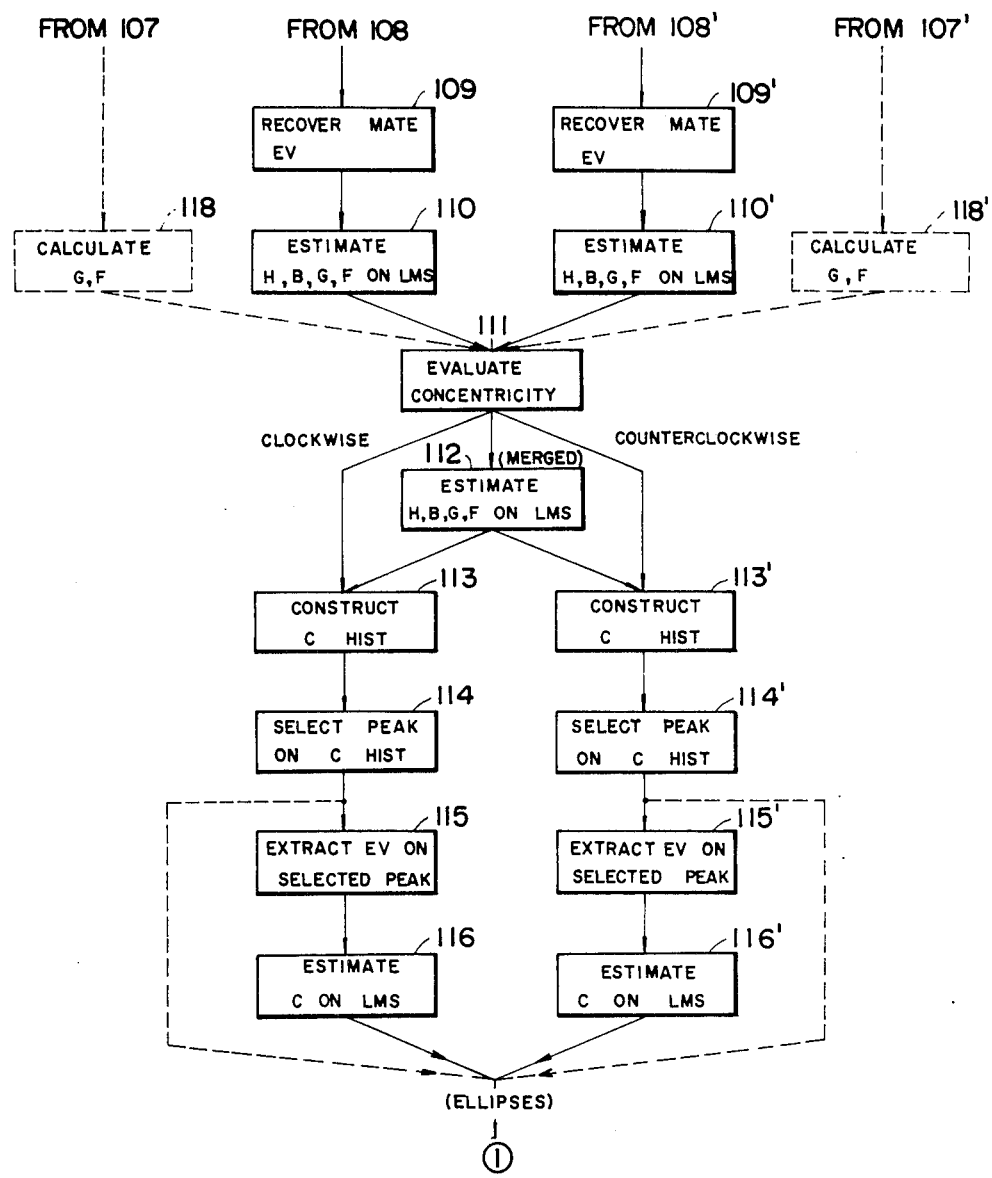

FIGS. 7A and 7B show an exemplary control flow-chart executed by a microcomputer according to the present invention. With reference to the figures, the processing steps of detecting a plurality of ellipses will be described hereinbelow. Image brightness signals I detected by an image pickup tube are inputted to a microcomputer through an appropriate interface (not shown). In response to these image signals, control first preprocesses these signals (in block 101). The preprocesses are to partially differentiating the image signals with respect to x and y to obtain edge image gradient $(\partial I/\partial x, \partial I/\partial y)$ in accordance with algorithms (6), and to obtain an edge vector field n having the locations (x, y) and directions (dx, dy) perpendicular to the edge image gradient I in the direction that the bright image will always be on the one side. A Sobel operator is used for partially differentiating the edge image signals, the number of which is approximately 5394, for instance. The obtained edge vectors are classified into groups according to the quantized directions which ranges from 0 to 360 degrees in 2 degree increments. The edge vectors corresponding to each of groups are listed in an edge vector table in accordance with the mate edge selecting algorithm: $\vec{n}_1 + \vec{n}_2 = 0$.

After the above-mentioned preprocess, the control selects and lists every pair of two mate edge vectors for which the summation in quantized directions is zero, that is, $\vec{n}_1 + \vec{n}_2 = 0$ is satisfied, and then calculates every midpoint of all pairs of two mate edge vectors in order to construct a two-dimensional center histogram (in block 102). A predetermined threshold eliminates small peak groups.

A peak value $(x_o, y_o)$ located farthest from a gravity center G of a plurality of center peaks is first selected. Thereafter, in the case where the edge vectors supporting the centered peak value are not distributed on the contour of a centered conic, a peak value having a maximum sum of a distance to the gravity center G and a distance to the first selected peak is next selected. That is to say, the peak selecting algorithm $$\max_i (|r_i| + |r_i - r_p|)$$

is executed to effectively select an elliptic center or to avoid the detection of spurious elliptic centers (in block 103). Once a center $(x_o, y_o)$ is determined, all the edge vectors which support the selected center, that is, may be distributed on the contours of ellipses having different eccentricities and orientations, are extracted and listed (in block 104).

The extracted edge vector field having the peak selected on the center histogram is separated into a clockwise-rotating vector field and a counterclockwise rotating vector field (in block 105). This is because the extracted edge vector field may include pairs of concentric ellipses of almost the same size.

For all the clockwise rotating edge vector field, control constructs an (H, B) histogram in accordance with algorithm $XdX + H(YdX + XdY) + BYdY = 0$ and in response to the detected edge location (x, y) and edge slope (dx, dy) on the basis of two-dimensional Hough transformation method (in block 106). The control selects a peak on the (H, B) histogram within a range determined by algorithms $H^2 - B < 0$ or $0.2 - 0.3 < r = b/a \leq 1$ (in block 107). Once an (H, B) peak is determined, all the edge vectors which support the selected coefficients H, B, that is, may be distributed on the contours of concentric ellipses are extracted and listed (in block 108).

The control recovers or relieves edge vectors having no mate edge vectors in accordance with algorithm $\vec{n}_p \cdot \vec{n}_t \geq (1.0 - \epsilon) |\vec{n}_p| \cdot |\vec{n}_t|$ in order to increase the sampling data (in block 109). Coefficients H, B, G, and F are all estimated again on the basis of the determined center $(x_o, y_o)$ and coefficients H and B in accordance with algorithm $Q_1$ of least mean square method (in block 110)..The same procedure is executed for the counterclockwise edge vector field (in blocks 106' to 110').

Before estimating coefficient C, control evaluates the concentricity of the clockwise edge vector field and the counterclockwise edge vector field in accordance with algorithm $U = W_1(\Delta x^2 - \Delta y^2) + W_2 \Delta \theta^2$ where $\Delta x = x_2 - x_1$, $\Delta y = y_2 - y_1$ and $\Delta \theta = \theta_2 - \theta_1$ (in block 111). If U is below a predetermined value, since this indicates that the two clockwise and counterclockwise edge vector fields are quivalent, a single ellipse is determined. In this case, all the coefficients H, B, G and F obtained by two separate steps are merged and these coefficients are estimated again (in block 112). If U is beyond a predetermined value, since this indicates that two clockwise and counterclockwise edge vector fields are two different ones, the rotation direction of the edge vector field is divided into two processing flows again.

Control constructs a C histogram in accordance with algorithm $C = -x^2 - 2Hxy - By^2 - 2Gx - 2Fy$ where $G = -x_o - Hy_o$ and $F = -Hx_o - By_o$ and in response to the detected edge location (x, y) and selected center $(x_o, y_o)$ (in block 113).

The control selects a peak value on the C histogram (in block 114). Once an (H, B) peak is determined, all the edge vectors which support the selected coefficients H, B, G, F, that is, may be distributed on the contours of a single ellipse is extracted and listed (in block 115). Lastly, the control estimates the last coefficient C on the basis of determined coefficients $\tilde{H}, \tilde{B}, \tilde{G}, \tilde{F}$ in accordance with the algorithm $Q_2$ of least mean square method (in block 116). The same procedure is executed for the counterclockwise edge vector field (in block 113' to 116'). By the above procedure, a single ellipse has been detected. Therefore, control erases the edge vector field corresponding to the detected ellipse from the initially detected image in order to reduce the spurious peaks on the center histogram (in block 117), returning to the block 102.

The above-mentioned procedure to detect a single ellipse is repeated sequentially. A plurality of ellipses can be detected and distinguished from each other separately on the basis of the respective center $(x_o, y_o)$ and coefficients H, B, G, F, C.

Further, the above-mentioned flowchart is an example when all the coefficients of ellipses are determined in accordance with least mean square method. When the coefficients H, B, G, F, C are directly determined on the basis of the respective peak values $(x_o, y_o, H, B, C)$ on the three histograms, the steps of blocks 108, 109, 110, 112, 115, 116 and 108', 109', 110', 112, 115', 116' are unnecessary. However, an additional step of calculating the coefficients G, F on the basis of $(x_o, y_o)$, and (H, B) is necessary (in block 118 and 118').

The control procedure of the present invention includes various algorithms. In order to facilitate understanding of the present invention, the important algorithms are arranged in order hereinbelow.

(1) To define an edge vector field $\vec{n}$:

$$\text{grad } I = (\partial I/\partial x, \partial I/\partial y) \quad (6)$$

$$\text{grad } I \cdot \vec{n} = 0 \quad (7)$$

$$\text{grad } I \times \vec{n}/|\text{grad } I \times \vec{n}| = (0,0,1) \quad (8)$$

where I denotes brightness.

(2) To construct a center histogram $(x_o, y_o)$:

$$\vec{n}_1 + \vec{n}_2 = 0 \quad (9)$$

(3) To eliminate spurious peaks on center histogram:

$$\max_i |r_i| \text{ or } \max_i (|r_i| + |r_i - r_p|) \quad (17)$$

(4) To construct an (H, B) histogram:

$$XdX + H(YdX + XdY) + BYdY = 0 \quad (4)$$

This equation is a tangent vector field of centered conics.

(5) To define an ellipse range on an (H, B) histogram:

$$B^2 - H < 0$$

and $$0.2 - 0.3 < r = b/a \leq 1 \quad (15)$$

(6) To calculate coefficient C:

$$C = -x^2 - 2Hxy - By^2 - 2Gx - 2Fy \quad (5)$$

$$G = -x_o - Hy_o,$$

$$F = -Hx_o - By_o$$

(7) To evaluate two concentric ellipses:

$$U = W_1(\Delta x^2 + \Delta y^2) + W_2 \Delta \Theta^2 \quad (18)$$

$$\Delta x = x_2 - x_1, \Delta y = y_2 - y_1, \Delta \Theta = \Theta_2 - \Theta_1$$

(8) To recover edge vectors having no mate vectors:

$$\frac{\vec{n}_p \cdot \vec{n}_t}{|\vec{n}_p| \cdot |\vec{n}_t|} = \cos\theta \geq 1.0 - \epsilon \quad (21)$$

(9) To calculate coefficients H, B, G, F on LMS:

$$Q_1 = \sum_i \{x_i d_i + H(y_i dx_i + x_i dy_i) + By_i dy_i + Gx_i + Fdy_i\}^2 \quad (19)$$

(10) To calculate coefficient C on LMS:

$$Q_2 = \sum_i \{C + x_i^2 + 2\tilde{H}x_i y_i + \tilde{B}y_i^2 + 2\tilde{G}x_i + 2\tilde{F}y_i\}^2 \quad (20)$$

In adopting Hough transformation method, the processing time is the most important problem. Assumption is made that the number of edge vectors of an edge image is N; the quantized angle of the edge vector direction is $d\theta$; the number of edge vectors supporting a peak on the center histogram is $N_C$; and the number of edge vectors supporting a peak on the (H, B) histogram is $N_H$. In general, since $N >> N_C > N_H$, the most of the processing time is spent for constructing the center histogram. Further, the total processing time is roughly estimated to be proportional to $N^2/d\theta$. The processing time is about from 1 to 1.5 minutes for each edge vector field.

The features of the present invention is to regard the edge image of ellipses as a two-dimensional vector field and to apply Hough transformation method to the vector field. This method decomposes, the five-dimensional Hough transformation space required for detecting an ellipse into three sub-spaces: center histogram space, (H, B) histogram space, and C histogram space. The advantages of the present invention are as follows:

(1) since the three histograms are one- or two-dimensional spaces, the processing time and memory capacity are not excessively great from the practical standpoint;

(2) a plurality of ellipses can be discriminated from other centered conics;

(3) a plurality of ellipses with various geometric properties can be detected; and (4) an ellipse can be detected when a part of the contour of the ellipse is detected.

As described above, in the method and system for detecting a plurality of ellipses according to the present invention, since ellipses can be detected reliably without being subject to a harmful influence of noise, it is possible to contribute to a robot technology in automatically inspecting or assembling machine parts in mass production processes.

It will be understood by those skilled in the art that the foregoing description is in terms of perferred embodiments of the present invention wherein various changes and modifications may be made without departing from the spirit and scope of the invention, as set forth in the appended claims.

What is claimed is:

1. A method of detecting an elliptical object, which comprises the following steps of:
   (a) transducing optical energy representative of image brightness of all locations (x, y) on an image plane including the elliptical object into electric brightness signals;
   (b) partially differentiating the transduced brightness signals with respect to x and y to obtain gradient signals representative of edge image brightness gradient $I=(\partial I/\partial x, \partial I/\partial y)$;
   (c) generating edge vector signals representative of locations (x,y) and directions (dx,dy) of an edge vector field in perpendicular to the edge image brightness gradient I in a direction such that the bright image will always be on one side of the vector signals;
   (d) selecting the edge vector signals representative of all pairs of mate edge vectors having opposite directions to each other and calculating all midpoints ($n_1+n_2=0$) between the two selected mate edge vectors;
   (e) selecting a center signal having a center peak value ($x_o$, $y_o$) from the calculated midpoints;
   (f) selecting vector signals representative of the locations (x, y) and directions (dx, dy) of the edge vectors supporting the centered conics having the selected center peak value ($x_o$, $y_o$) from the edge vector field signals;
   (g) transforming the selected values (x, y, dx, dy) of the edge vector signals to a first two-dimensional ($p=(YdX+XdY)/YdY$, $Q=XdX/YdY$) space to form a first straight line and calculating all intersections of second straight lines corresponding to each transformed point on the first straight line in a second two-dimensional (H, B) space in accordance with a Hough transformation method;
   (h) selecting a signal having a peak value located within a specific range ($H^2-B<0$) on the (H, B) space for detecting an ellipse;
   (i) calculating coefficients $G=-X_o-Hy_o$ and $F=-Hx_o-By_o$ of an ellipse group having the same center on the basis of the selected coefficients H, B and the selected center locations ($x_o$, $y_o$);
   (j) calculating coefficients C on the basis of the calculated coefficients H, B, G, F and the edge vector locations (x, y); and
   (k) selecting a peak value from the calculated coefficients C to identify a detected ellipse.

2. A method of detecting an elliptical object as set forth in claim 1, which further comprises the following steps of:
   (a) selecting all edge vector signals contributed to the selected (H, B) peak value;
   (b) selecting edge vector signals having no mate edge vectors but lying within a predetermined small angle range in the direction of the mate edge vectors of a concentric ellipse group determined by the selected (H, B) peak value;
   (c) calculating coefficients H, B, G, F again on the basis of the detected edge vector locations (x, y) and calculated coefficients H, B based on least mean square method;
   (d) selecting all the edge vector signals contributed to the selected C peak value; and
   (e) calculating a coefficient C again on the basis of the detected edge vector locations (x, y) and coefficients H, B, G, F already calculated in step (c) above based on least mean square method.

3. A method of detecting an elliptical object as set forth in claim 1, wherein in step (h) of selecting a peak value signal on the (H, B) space, the range from which an (H, B) peak value is selected is limited to a narrower practical range such that the ratio R of minor axis length b to major axis length a lies between 0.2 and 1.

4. A method of detecting an elliptical object as set forth in claim 1, wherein the edge vector signals below a predetermined threshold are eliminated.

5. A method of detecting an elliptical object as set forth in claim 1, wherein the center signals below a predetermined threshold are eliminated.

6. A method as recited in claim 1 comprising the further step of producing an output signal indicating detection of the ellipse.

7. A method as recited in claim 1 wherein said optical energy representation is produced in a two dimensional image plane by an image pick up tube.

8. A method of detecting an elliptical object as set forth in claim 1, wherein in step (h) of selecting a peak value signal on the (H, B) space, the range from which an (H, B) peak value is selected is limited to a narrower practical range such that the ratio R of minor axis length b to major axis length a lies between 0.2 and 1, thereby detecting an ellipse corresponding to a shape of mechanical contour when projected on an image plane.

9. A system for detecting an elliptical object, which comprises:
   (a) means (10) for transducing optical energy representative of the image brightness of the elliptical object into electric image signals corresponding thereto on an image plane (x, y);
   (b) means (11) for generating an edge vector field n having locations (x, y) and directions (dx, dy) and perpendicular to the obtained edge image brightness gradient I in an direction that the bright image will always be on a one side, in response to the image signals from said transducing means, by partially differentiating the detected image signals with respect to x and y to obtain an edge image brightness gradient $I=(\partial I/\partial x, \partial I/\partial y)$ and by extracting the differentiated image signals beyond a predetermined threshold;
   (c) means (12) for outputting common signals to sequentially control the processing procedure of the entire system itself;
   (d) means (13) for constructing a two-dimensional center histogram by extracting all pairs of mate edge vectors having opposite directions to each other from the generated edge vector field and by calculating all midpoints ($\vec{n}_1+\vec{n}_2=0$) between the two extracted mate edge vectors;
   (e) means (14) for detecting a peak value ($x_o$, $y_o$) on the center histogram constructed by said center histogram constructing means;
   (f) means (15) for extracting all the edge vectors supporting the centered conics having the detected center peak value ($x_o$, $y_o$) from the edge vector field;

(g) means (17) for contructing an (H, B) histograms by mapping the values (x, y, dx, dy) of the edge vectors to a first two-dimensional $(P=(YdX+XdY)/YdY, Q=XdX/dY)$ space to form a first straight line and by calculating all intersections of second straight lines corresponding to each mapped point on the first straight lines in a second two-dimensional (H, B) space in accordance with Hough transformation method;

(h) an (H, B) peak value on the (H, B) histogram being deteced by the peak value detecting means, independently, within a predetermined range $(H^2 - B < 0)$;

(i) means (25) for calculating coefficients G, F of the edge vector group, in response to the center location $(x_o, y_o)$ and the coefficients detected by said peak value detecting means;

(j) means (21) for constructing a C histogram of the selected concentric ellipse group in a one-dimensional space in response to the edge vectors (x, y) from said edge vector field generating means, the center $(x_o, y_o)$ and coefficients H, B detected by said peak value detecting means and the coefficients G, F calculated by said coefficient calculating means; and (k) means (22) for detecting a peak value on the histogram of the one-dimensional space constructed by said C histogram constructing means.

10. A system for detecting an elliptical object as set forth in claim 6, which further comprises:

(a) means (18) for recovering edge vectors having no mate edge vectors but lying within a predetermined small angle range in the direction of the mate edge vectors of a concentric ellipse group determined by the (H, B) peak value detected on the (H, B) histogram and extracted by said edge vector extracting means;

(b) means (19) for calculating coefficients (H, B, G, F) in response to the edge vector filed (x, y, dx, dy) from said edge vector generating means, and the center $(x_o, y_o)$ and the coefficients (H, B) detected by said peak value detecting means on least mean square method;

(c) means (23) for extracting all edge vectors which support the detected C peak value on the C histogram from the edge vector field;

(d) means (24) for calculating coefficient C in response to the edge vector field (x, y) from said edge vector generating means and the coefficients ($\bar{H}$, $\bar{B}$, $\bar{G}$, $\bar{F}$) already estimated by said H, B, G, F calculating means on least means square method.

11. A method of detecting a plurality of elliptical objects which comprises the following steps of:

(a) transducing optical energy representative of image brightness of the elliptical objects into electric brightness signals corresponding thereto at all locations (x, y) on an image plane;

(b) partially differentiating the transduced brightness signals with respect to x and y to obtain gradient signals representative of edge image brightness gradient $I = (\partial I/\partial x, \partial I/y)$;

(c) generating edge vector signals representative of locations (x, y) and directions (dx, dy) of an edge vector field n perpendicular to the edge image brightness gradient I in the direction that the bright image will always be on the one-hand side;

(d) selecting the edge vector signals representative of all pairs of mate edge vectors having opposite directions to each other and calculating all midpoints $(\bar{n}_1 + \bar{n}_2 = 0)$ between the two selected mate edge vectors;

(e) selecting a center signal having a center peak value $(x_o, y_o)$ from the calculated midpoints;

(f) selecting vector signals representative of the locations (x, y) and directions (dx, dy) of the edge vectors supporting the centered conics having the selected center peak value $(x_o, y_o)$ from the edge vector field signals;

(g) separating all the selected edge vector signals into a clockwise-rotating vector field and a counter-clockwise-rotating vector field;

(h) transforming the selected values (x, y, dx, dy) of the edge vectors signals to a first two-dimensional $(P = YdX + YdY)/YdY, Q = XdX/YdY)$ space to form a first straight line and calculating all intersections of second straight line corresponding to each transformed point on the first straight line in a second two-dimensional (H, B) space in accordance with Hough transformation method;

(i) selecting a peak value signal located within a specific range $(H^2 - B < 0)$ on the (H, B) space;

(j) calculating coefficients $G = -x_o - Hy_o$ and $F = -Hx_o - By_o$ of an ellipse group having the same center on the basis of the selected coefficients H, B and the selected center locations $(x_o, y_o)$;

(k) similarly executing the above same procedure from (h) to (j) for counterclockwise-rotating vector field;

(l) determining the concentricity of the two calculated clockwise and counterclockwise concentric ellipse groups on the basis of the differences in center locations $(\Delta x = x_2 - x_1, \Delta y = y_2 - y_1)$ and orientation $(\Delta \theta = \theta_2 - \theta_1)$;

(m) if the two concentric ellipse groups are determined to be a single group, calculating the coefficient C on the basis of the calculated merged coefficients H, B, G, F and the edge vector locations (x, y);

(n) selecting a peak value from the calculated coefficients C to identify a detected ellipse;

(o) if the above two concentric ellipse groups are determined to be two different groups, constructing two one-dimensional C space groups separately for each ellipse group by calculating each coefficient C on the basis of the estimated coefficients H, B, G, F and edge vector locations (x, y);

(p) selecting each peak value from the calculated coefficients C for each ellipse group separately;

(q) neglecting all the edge vector signals supporting the detected ellipse from the detected edge vectors; and (r) repeating the above steps to detect a plurality of ellipses one by one;

12. A method of detecting a plurality of elliptical objects as set forth in claim 11, which further comprises the following steps of:

(a) selecting all edge vector signals contributed to the selected (H, B) peak value;

(b) selecting edge vector signals having no mate edge vectors but lying within a predetermined small angle range in the direction of the mate edge vectors of a concentric ellipse group determined by the selected (H, b) peak value;

(c) calculating coefficients H, B, G, F again on the basis of the detected edge vector locations (x, y) detected directions (dx, dy), selected center $(s_o, y_o)$ and calculated coefficients H, B on least means square method;

(d) selecting all the edge vector signals contributed to the selected C peak value; and (e) calculating a coefficient C again on the basis of the detected edge vector locations (x, y) and coefficients H, B, G, F already estimated in step (c) above based on least mean square method.

13. A method of detecting a plurality of elliptical objects as set forth in claim 11, wherein in the step (e) of selecting a center peak value signal $(x_o, y_o)$ on the center space, a peak value $(x_o, y_o)$ located farthest from a gravity center G of a plurality of center peaks is first selected and thereafter a peak value $(x_o, y_o)$ having a maximum sum of a distance to the first selected peak value is selected.

14. A method of detecting a plurality of elliptical objects as set forth in claim 11, wherein in the step (i) of selecting a peak value signal on the (H, B) space, the range from which an (H, B) peak value is selected is limited to a narrower practical range such that the ratio r of minor axis b to major axis length a lies from 0.2 to 1.

15. A method of detecting a plurality of elliptical objects as set forth in claim 11, wherein the edge vector signals below a predetermined threshold are eliminated.

16. A method of detecting a plurality of elliptical objects as set forth in claim 1, wherein the center signals below a predetermined threshold are eliminated.

17. A system for detecting a plurality of elliptical objects, which comprises:

(a) means (10) for transducing optical energy representative of the image brightness of elliptical objects into electric image signals corresponding thereto on an image plane (x, y);

(b) means (11) for generating an edge vector field $\vec{n}$ having locations (x, y) and directions (dx, dy) and perpendicular to an obtained edge image brightness gradient I in the direction that the bright image will always be on a one side, in response to the image signals from said transducing means, by partially differentiating the detected image signals with respect to x and y to obtain an edge image brightness gradient $I=(\partial I/\partial x, \partial I/\partial y)$ and by extracting the differentiated image signals beyond a predetermined threshold;

(c) means (12) for outputting common signals to sequentially control the processing procedure of the entire system itself.

(d) means (13) for constructing a two-dimensional center histogram by extracting all pairs of mate edge vectors having opposite directions to each other from the generated edge vector field and by calculating all midpoints $(\vec{n_1}+\vec{n_2}=0)$ between the two extracted mate edge vectors;

(e) means (14) for detecting a peak value $(x_o, y_o)$ on the center histogram constructed by said center histogram constructing means;

(f) means (15) for extracting all the edge vectors supporting the centered conics having the detected center peak value $(x_o, y_o)$ from the edge vector field;

(g) means (16) for separating all the edge vectors extracted by said edge vector extracting means into clockwise-rotating vectors and counterclockwise-rotating vectors;

(h) means (17) for constructing two different (H, B) histograms by mapping the values (x, y, dx, dy) of the clockwise-rotating and counterclockwise-rotating edge vectors separated by said edge vector separating means onto two different first two-dimensional $(P=(YdX+XdY)/YdY, Q=XdX/dY)$ spaces independently to form first straight lines and by calculating all intersections of second straight lines corresponding to each mapped point on the first straight lines in two different second two-dimensional (H, B) spaces in accordance with Hough transformation method;

(i) an (H, B) peak value on each (H, B) histogram being detected by said peak value detecting means, independently, within a predetermined range $(H^2-B<0)$;

(j) means (25) for calculating coefficients G, F of the clockwise- and counterclockwise-rotating edge vector groups separately, in response to the center location $(x_o, y_o)$ and the coefficients detected by said peak value detecting means;

(k) means (20) for evaluating the concentricity of two estimated clockwise- and counterclockwise-rotating concentric ellipse group having the same coefficients H, B, G, F in accordance with an empirical expression by which the differences in center locations and axis orientations are checked, the edge vector fields separated by said edge vector field separating means being determined to be two different concentric ellipse groups if the differences are beyond a predetermined value and to be an equivalent concentric ellipse group if the difference are below the predetermined value;

(l) means (21) for constructing a C histogram of each concentric ellipse group in a one-dimensional space in response to the edge vectors (x, y) from said edge vector field generating means, the center $(x_o, y_o)$ and coefficients H, B detected by said peak value detecting means and the coefficients G, F calculated by said coefficient calculating means; and (m) means (22) for detecting a peak value on each C histogram in the one-dimensional space constructed by said C histogram constructing means.

18. A system for detecting a plurality of elliptical objects as set forth in claim 17, which further comprises:

(a) means (10) for recovering edge vectors having no mate edge vectors but lying within a predetermined small angle range in the direction of the mate edge vectors of a concentric ellipse group determined by the (H, B) peak value detected on the (H, B) histogram and extracted by said edge vector extracting means;

(b) means (19) for calculating coefficients (H, B, G, F) in response to the edge vector field (x, y, dx, dy) from said edge vector generating means, and the center $(x_o, y_o)$ and the coefficients (H, B) detected by said peak value detecting means on least mean square method;

(c) means (23) for extracting all edge vectors which support the detected C peak value on the C histogram from the edge vector field;

(d) means (24) for calculating coefficient C in response to the edge vector field (x, y) from said edge vector generating means and the coefficients $(\bar{H}, \bar{B}, \bar{G}, \bar{F})$ already estimated by said H, B, G, F calculating means on least means square method.

* * * * *